United States Patent Office 2,875,190
Patented Feb. 24, 1959

2,875,190

METALLIZABLE AZO DYES PREPARED FROM A BENZOTHIAZOLE DERIVATIVE AND β-NAPHTHOL

James M. Straley and John G. Fisher, Kingsport, Tenn., assignors to Eastman Kodak Company, Rochester, N. Y., a corporation of New Jersey No Drawing. Application April 15, 1957
Serial No. 652,689

7 Claims. (Cl. 260—146)

This invention relates to certain metallized azo dyes and their application to the dyeing or coloration of various materials.

The dyes of this invention are metallized complexes of azo dyes having the structural formula:

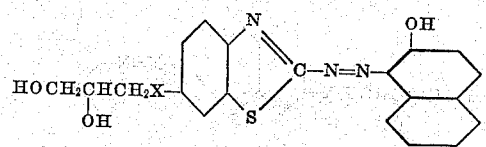

wherein X is selected from the group consisting of S and $SO_2$.

The non-metallized dyes that are employed in preparing the dyes of this invention are prepared by diazotizing an amine having the structural formula:

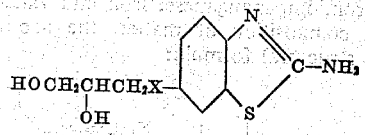

wherein X is as defined above. The resulting diazo compound is then reacted or coupled with β-naphthol to form the non-metallized dyes of this invention. The non-metallized dyes, after their preparation, are reacted with a metal salt, such as suitable salts of nickel, cobalt, copper, chromium, manganese, iron or vanadium. The non-metallized azo compounds can be metallized either on or off the materials they color. Metallization can be carried out, for example, by treating the non-metallized azo compound with a solution or dispersion of the metallizing agent. Although the metal complex is often formed at room temperature, we prefer to accelerate the process by heating, usually with steam, for a short period of time. The metallization is effected by procedures well known to those skilled in the art to which this invention is directed.

Illustrative of the metallizing agents that can be employed are the halides, the sulfates, the acetates, the cyanides and the thiocyanates of nickel, cobalt, chromium, manganese, iron and vanadium as well as various copper compounds. Thus, nickel chloride, nickel bromide, nickel sulfate, nickel acetate, nickel cyanide, nickel formate, nickel thiocyanate [$Ni(SCN)_2$], cobaltous bromide, cobaltic chloride, cobaltous chloride, cobaltous acetate, cobaltous cyanide, cobalt thiocyanate [$Co(SCN)_2$], cupric chloride, cupric bromide, cupric acetate, cupric lactate, chromium trichloride, chromium tribromide, chromic sulfate, chromic acetate, chromium thiocyanate [$Cr(SCN)_3$], manganese chloride, manganous sulfate, manganese acetate, manganese thiocyanate [$Mn(SCN)_2$], ferric chloride, ferric fluoride, ferrous acetate, ferrous thiocyanate [$Fe(SCN)_2$], ferric thiocyanate [$Fe(SCN)_3$], and vanadium thiocyanate [$V(SCN)_2$] are illustrative of the metallizing agents that can be employed.

The non-metallized monoazo compounds described herein are useful for the dyeing of cellulose alkyl carboxylic acid esters having 2 to 4 carbon atoms in the acid groups thereof, nylon, sulfone polyesters, polyethylene terephthalate and polyacrylonitrile. After application to these materials, usually in the form of textile materials, the dye is metallized thereon. The metallized azo compounds of our invention can be applied by ordinary dyeing or printing techniques to nitrogenous textile materials such as wool, silk, nylon and acrylonitrile polymers, for example. Coloration can also be effected by incorporating the non-metallized or metallized azo compounds into the spinning dope, spinning the fiber as usual and converting the non-metallized azo compounds to their metallized form. Also the metallizing agent can be incorporated in the spinning dope, the fiber spun as usual and then dyed with the non-metallized monoazo compounds to form the metal complex on the fiber. The new metallized dyes of our invention are preferably formed by heating the non-metallized azo dye with the metallizing agent in organic solvents such as, for example, cellulose acetate, cellulose acetate-propionate, acrylonitrile polymers, polyamides, methyl cellosolve and formamide.

As is well known, one of the disadvantages dyed cellulose acetate textile fabrics suffer in comparison with some of the dyed competing textile fabrics, such as cotton, wool and viscose, for example, is lack of fastness to washing. Many schemes have been proposed to remedy this situation but all suffer from some significant fault. By means of our invention dyed cellulose acetate textile materials having good-to-excellent fastness to washing, light and gas are obtainable. These results may be obtained by dyeing the cellulose acetate textile material with the non-metallized azo compounds and then treating the dyed cellulose acetate textile material with suitable metal salts which cause the original dye to form metallic complexes which are resistant, for example, to the action of washing, light and gas. These results can also be obtained by incorporating the metallized azo dye into the cellulose acetate spinning dope and spinning the fiber as usual. Thus, by means of the present invention, the disadvantage noted above with respect to the wash fastness of dyed cellulose acetate textile materials is either entirely or largely overcome. Cellulose acetate has been particularly referred to because it is the most widely used cellulose alkyl carboxylic acid ester.

When the metal complex is formed on a cellulose alkyl carboxylic acid ester, such as cellulose acetate fiber, the use of a metal thiocyanate appears to be advantageous and is preferred. Nickel thiocyanate appears to be especially useful and particular claim is laid to its use. Next to nickel thiocyanate the use of cobalt thiocyanate is preferred.

Metallization will be described in detail with reference to nickel and cobalt inasmuch as the metallized dyes containing these materials in complex combination appear to be advantageous. However, it will be clearly understood that the non-metallized azo compounds can be metallized with the other metals disclosed herein. The azo compounds disclosed herein have varying utility as dyes. The degree of utility varies, for example, depending upon the material being colored and the actual dye employed.

The following examples are illustrative of this invention:

Example 1

50 g. (0.242 m.) of 2-amino-6-thiocyanobenzothiazole, 58 g. of $Na_2S \cdot 9H_2O$, and 360 cc. of ethanol were refluxed 10 minutes. 26.7 g. of glycerin monochlorohydrin were added dropwise in about 15 minutes at reflux. After refluxing 1 hour longer, the solution was poured into 1800 cc. of water and evaporated to a total volume of 1.5 liters. Upon standing in the cold, crystals formed and were filtered off and washed with ice water. After drying in vacuo, there were obtained 53.4 g. of 2-amino-6(β,γ - dihydroxypropylthio)benzothiazole, melting at 124–6.5° C.

Example 2

9 g. (0.035 m.) of the product of Example 1 were dissolved in 20 cc. of glacial acetic acid. After cooling to room temperature, 10 cc. of 30% $H_2O_2$ were added, the temperature rising to about 65° C. The solution was evaporated to dryness in vacuo and the residue recrystallized from 30 cc. of acetic acid. The yield was 8 g. of 2 - amino - 6(β,γ - dihydroxypropylsulfonyl)benzothiazole, melting at 200–203° C.

Example 3

7.68 g. (0.03 m.) of the product of Example 1 were dissolved in 72 cc. of water containing 42 cc. of concentrated $H_2SO_4$. The solution was cooled to −8° C. and diazotized by stirring in a solution of 2.3 g. sodium nitrite in 15 cc. of concentrated $H_2SO_4$ below 0° C. After addition, the mix was stirred 2 hours longer at 0–5° C. and added to a solution of 4.32 g. of β-naphthol in 90 cc. of 1:5 propionic-acetic acid below 5° C. The mix was stirred 2 hours longer without cooling and 700 cc. cold water added. An oil resulted so the water was decanted off and the oil boiled with 200 cc. of methyl cellosolve. This solution was poured into 1500 cc. of cold water with good stirring. The resultant solid was filtered off, washed with water, and air-dried. The yield was 10.25 g. of dye which, after treatment with nickel thiocyanate on cellulose acetate, produced deep blue dyeings of excellent resistance to the action of light and laundering.

Example 4

2.88 g. (0.01 m.) of the product of Example 2 were dissolved in a solution of 14 cc. of $H_2SO_4$ in 24 cc. of water. After cooling to 0° C. it was diazotized with 0.76 g. of $NaNO_2$ in 5 cc. $H_2SO_4$ as in Example 3. The diazo was run into a solution of 1.28 g. of hydroquinone monomethyl ether in 20 cc. of water below 5° C. The coupling was stirred 2 hours without further cooling and the product filtered off, washed, and dried in air. The yield was 3.1 g. of dye which, after reaction with nickel thiocyanate, imparts beautiful blue-green shades to cellulose acetate.

Example 5

When cobalt thiocyanate was used in Example 3 in place of nickel thiocyanate, the dye was somewhat duller, but of the same excellent light and wash fastness. Similar results were obtained when cobalt thiocyanate was used in Example 4.

Example 6

1 g. of the non-metallized dye of Example 3 was stirred and refluxed in acetone. There were added 3 cc. of 28% $NH_4OH$ followed by a solution of 0.8 g. nickelous acetate crystals in 16 cc. of acetone. After three hours reflux the mix was drowned in 400 cc. of water and the pigment filtered off, washed and dried. The product when incorporated in cellulose acetate yarn imparted deep shades of blue of excellent resistance to the action of light.

Example 7

The procedure of Example 6 was repeated using as the metallizing agent 0.8 g. of cobaltous acetate. The pigment showed excellent fastness properties but was somewhat redder in shade.

We claim:

1. As a composition of matter, the azo compounds selected from the group consisting of monoazo compounds and their metal complexes in combination with a metal selected from the group consisting of nickel, cobalt, copper, chromium, manganese, iron and vanadium, said monoazo compounds having the structural formula:

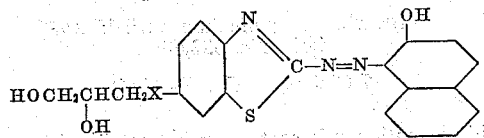

wherein X is selected from the group consisting of S and $SO_2$.

2. As a composition of matter, the azo compounds having the structural formula:

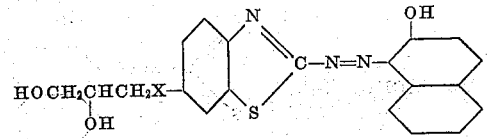

wherein X is selected from the group consisting of S and $SO_2$.

3. As a composition of matter, the metal complexes of the azo compounds set forth in claim 2, said metal being selected from the group consisting of nickel, cobalt, copper, chromium, manganese, iron and vanadium.

4. As a composition of matter, the azo compound having the structural formula:

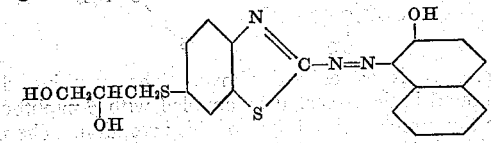

5. As a composition of matter, the nickel complex of the azo compound set forth in claim 4.

6. As a composition of matter, the azo compound having the structural formula:

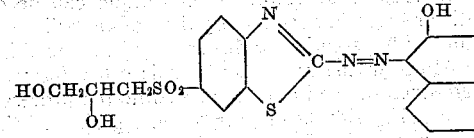

7. As a composition of matter, the nickel complex of the azo compound set forth in claim 6.

References Cited in the file of this patent

UNITED STATES PATENTS

| | | |
|---|---|---|
| 2,003,444 | Herz et al. | June 4, 1935 |
| 2,019,529 | Engelmann | Nov. 5, 1935 |
| 2,686,176 | Gunst | Aug. 10, 1954 |
| 2,686,177 | Gunst | Aug. 10, 1954 |